United States Patent [19]
Tottori et al.

[11] Patent Number: 4,714,056
[45] Date of Patent: Dec. 22, 1987

[54] TWO-CYCLE ENGINE

[75] Inventors: Takumi Tottori, Fujimi; Kenji Oki, Asaka; Kazuo Ooyama, Niiza; Toshio Mizushima, Wako, all of Japan

[73] Assignee: Honda Giken Kogyo Kabushiki Kaisha, Japan

[21] Appl. No.: 760,306

[22] Filed: Jul. 29, 1985

[30] Foreign Application Priority Data

Aug. 3, 1984 [JP] Japan ................................ 59-162791
Feb. 15, 1985 [JP] Japan ................................ 60-27951
Feb. 15, 1985 [JP] Japan ................................ 60-27953

[51] Int. Cl.$^4$ ............................................. F02B 75/02
[52] U.S. Cl. ........................... 123/65 PE; 123/65 EM
[58] Field of Search ........... 123/65 PE, 65 A, 65 PD, 123/65 P, 65 EM; 60/282, 313, 323

[56] References Cited

U.S. PATENT DOCUMENTS

| | | | |
|---|---|---|---|
| 3,395,679 | 8/1968 | Christner | 60/314 |
| 3,543,509 | 12/1970 | Boerma | 123/195 R |
| 3,695,238 | 10/1972 | Boerma | 60/313 |
| 3,875,744 | 4/1975 | Brooks et al. | 60/313 |
| 3,938,330 | 2/1976 | Nakajima et al. | 60/324 |
| 4,187,809 | 2/1980 | Lanpheer et al. | 123/65 EM |
| 4,197,704 | 4/1980 | Date et al. | 60/313 |
| 4,312,308 | 1/1982 | Slattery | 123/65 EM |

FOREIGN PATENT DOCUMENTS

| | | | |
|---|---|---|---|
| 2313232 | 9/1974 | Fed. Rep. of Germany . | |
| 0018521 | 2/1977 | Japan | 60/313 |
| 0032417 | 3/1977 | Japan | 60/313 |
| 0109718 | 8/1980 | Japan | 60/313 |
| 57-135222 | 8/1982 | Japan . | |
| 0170815 | 10/1983 | Japan | 60/313 |
| 955056 | 4/1964 | United Kingdom . | |

*Primary Examiner*—Craig R. Feinberg
*Assistant Examiner*—David A. Okonsky
*Attorney, Agent, or Firm*—Darby & Darby

[57] ABSTRACT

A two-cycle engine includes a cylinder block having at least one pair of first and second cylinders, the first and second cylinders having a pair of first and second exhaust ports, respectively. A pair of first and second pistons are received respectively in the first and second cylinders for reciprocal movement therealong, each of the exhaust ports being selectively closed and opened by a respective one of the pistons during the movement thereof along a respective one of the cylinders. The first and second pistons are operatively connected to a crankshaft in such a manner that the first and second pistons are reciprocable 180° out of phase along the respective cylinders. A final portion of the duration of opening of one of the exhaust ports overlaps an initial portion of the duration of opening of the other. An exhaust passage has a communicating portion communicating the first and second exhaust ports with each other adjacent thereto.

3 Claims, 18 Drawing Figures

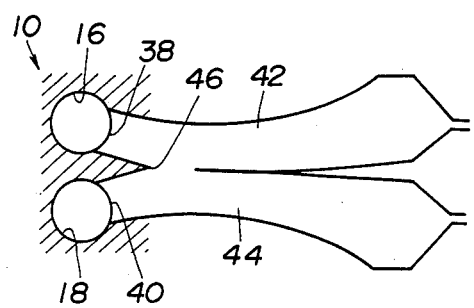
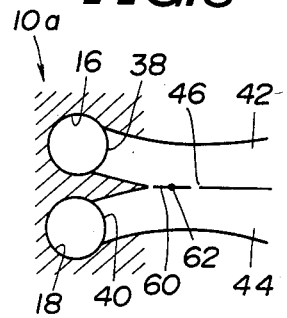
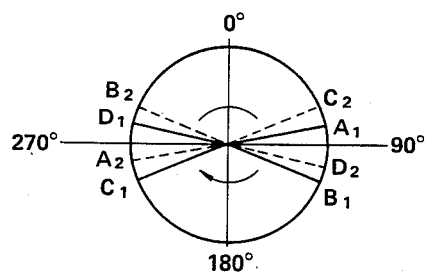
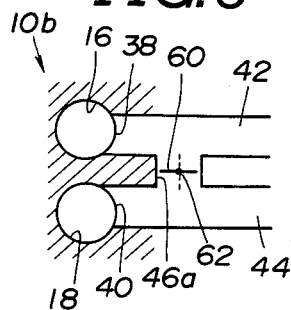
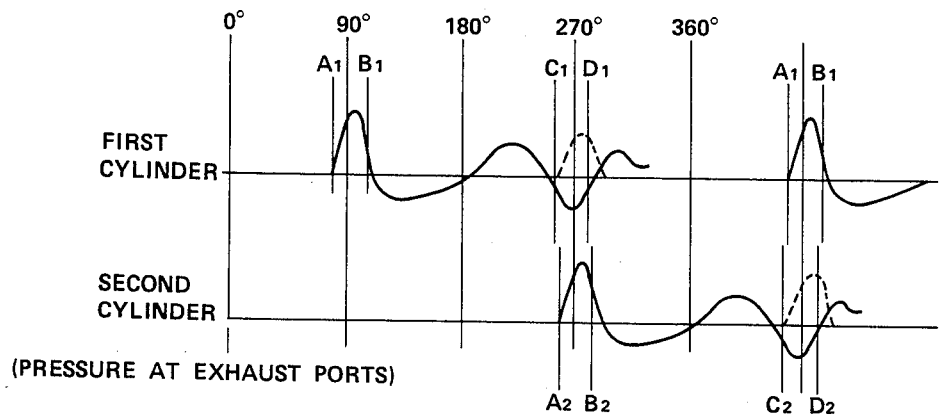

TWO-CYCLE ENGINE

BACKGROUND OF THE INVENTION

1. Field of the Invention

This invention relates to a two-cycle engine with at least one pair of cylinders of which power strokes begin alternately at each 180° of crankshaft rotation.

2. Prior Art

In conventional two-cycle engines, blowby gas tending to flow from a combustion chamber through an exhaust port is forced back into the combustion chamber by a reflected pressure wave of the exhaust gas produced by the provision of an exhaust chamber formed in an exhaust passage, thereby improving charging efficiency of the fuel-air mixture in the combustion chamber to achieve an increased power output. As is known, the reflected wave is composed of alternate positive pressure and negative pressure portions. Therefore, to achieve the improved charging efficiency mentioned above, it is necessary that the positive pressure portion of the reflected wave should reach the exhaust port to efficiently force the blowby gas back to the combustion chamber during a time period between the closing of the scavenge port and the closing of the exhaust port. However, this can be done only in a predetermined range of the engine speed which range is determined by the length of the exhaust chamber. Therefore, in those ranges of the engine speed other than such a predetermined range, the charging efficiency can not be improved, which results in failure to obtain a desired power output. To make matters worse, when the negative pressure portion of the reflected wave reaches the exhaust port during the time period between the closing of the scavenge port and the closing of the exhaust port, the blowby gas is positively drawn into the exhaust passage through the exhaust port to thereby lower the charging effiencey.

In order to overcome this difficulty, it has been proposed in Japanese Utility Model Publication No. 59-41290 to provide a sub-chamber in the exhaust passage, and the communication of the sub-chamber with the exhaust passage is controlled by means of a valve in accordance with the engine speed. More specifically, when the positive pressure portion of the reflected wave is not to arrive at the exhaust port during the time period between the successive closings of the scavenge and exhaust ports, the valve is opened to cause the gas in the sub-chamber to flow therefrom into the exhaust passage to attenuate the reflected wave travelling toward the exhaust port, thereby preventing the charging effiency from being lowered.

Japanese Utility Model Application Laid-Open (Kokai) No. 51-163314 discloses another alternative to overcome the above difficulty by providing a valve in the exhaust passage which valve is operated to move between closed and open positions to vary the effective length of the exhaust passage in accordance with the engine speed, so that the positive pressure portion of the reflected wave can reach the exhaust port over a wide range of the engine speed before the exhaust port is closed.

The above conventional two-cycle engines have been found not entirely satisfactory, however, in the following respects. First, in the case where the two-cycle engine is of the multi-cylinder type, either sub-chambers or actuators for operating valves must be provided in respective exhaust passages. This increases the size and weight of the exhaust pipe. In addition, it is quite possible that the use of a plurality of valve actuators affects the reliability of the engine.

SUMMARY OF THE INVENTION

It is therefore an object of this invention to provide a two-cycle engine with at least pair of cylinders which can produce a desired power output over an entire effective range of the engine speed, and is lightweight and reliable in operation.

According to the present invention, There is provided a two-cycle engine comprising:

(a) a cylinder block having at least one pair of first and second cylinders, said first and second cylinders having a pair of first and second exhaust ports, respectively, (b) a pair of first and second pistons received respectively in said first and second cylinders for reciprocal movement therealong, each of said first and second exhaust ports being selectively closed and opened by a respective one of said first and second pistons during the movement thereof along a respective one of said cylinders;

(c) crankshaft means to which said first and second pistons are operatively connected in such a manner that said first and second pistons are reciprocable 180° out of phase along the respective cylinders, a final portion of the duration of opening of one of said exhaust ports overlapping an initial portion of the duration of opening of the other; and (d) exhaust passage means having means communicating said first and second exhaust ports with each other adjacent thereto.

BRIEF DESCRIPTION OF THE DRAWINGS

FIG. 2 is a schematic view of a portion of the engine;

FIG. 3 is a diagrammatical illustration showing the relation between the opening and closing of each of first and second exhaust ports as well as the relation between the opening and closing of first and second scavenge ports;

FIG. 4 is a diagrammatical illustration showing a change in pressure at each of the first and second exhaust ports;

FIG. 5 is a view similar to FIG. 2 but showing a modified engine;

FIG. 6 is a view similar to FIG. 2 but showing another modified engine;

DESCRIPTION OF THE PREFERRED EMBODIMENTS OF THE INVENTION

Figure 1:
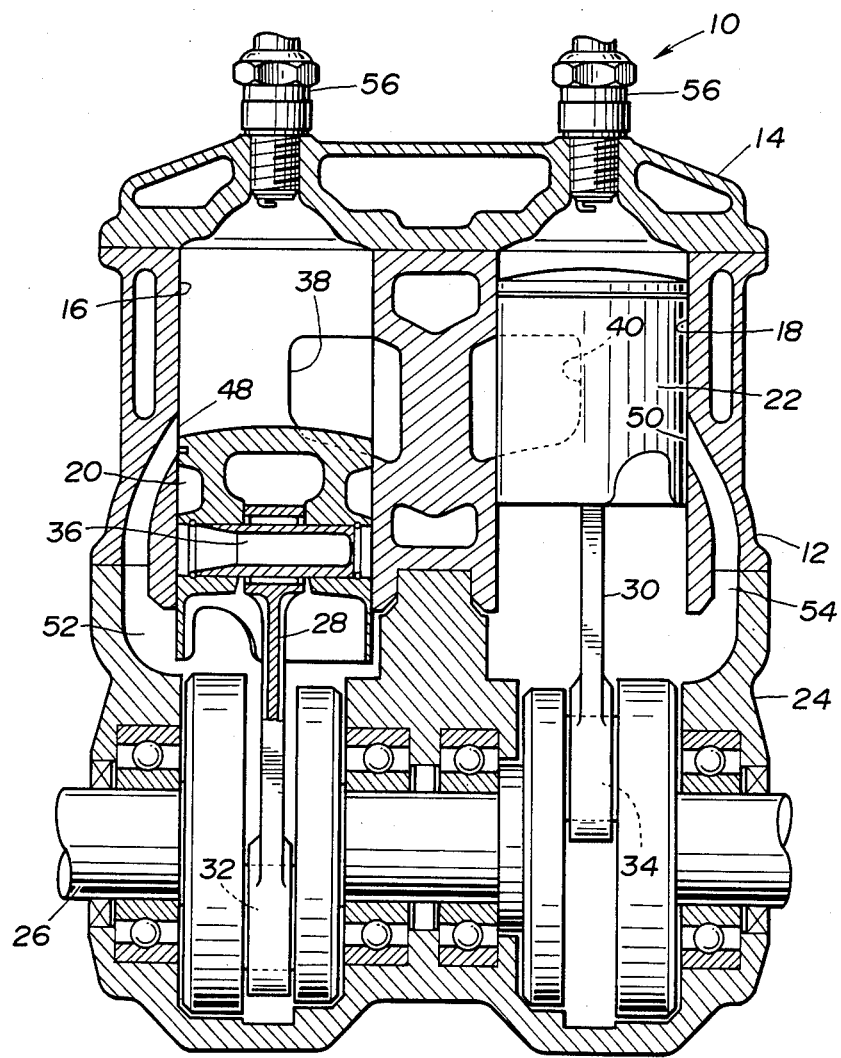
FIG. 1 is a cross-sectional view of a two-cycle engine provided in accordance with the present invention.

The invention will now be described with reference to the accompanying drawings in which like reference numeral denote corresponding parts in several views.

FIG. 1 shows a two-cycle internal combustion engine 10 which comprises a cylinder block 12 having a cylinder head 14 thereon, the block 12 having a pair of first and second cylinders 16 and 18. A pair of first and second pistons 20 and 22 received respectively in the first and second cylinders 16 and 18 for reciprocal movement therealong. A crankcase 24 is mounted on the block 12. The first and second pistons 20 and 22 are connected to a crankshaft 26 via respective connecting rods 28 and 30. One end of the connecting rods 28 and 30 are rotatably fitted on first and second crank pins 32 and 34, respectively, the crank pins 32 and 34 being displaced 180° from each other with respect to the crankshaft 26. The other end of each of the connecting rods 28 and 30 is connected to a respective one of the pistons 20 and 22 by a wrist pin 36.

A pair of first and second exhaust ports 38 and 40 are formed in walls of the first and second cylinder 16 and 18, respectively. The interiors of the first and second cylinders 16 and 18 communicate respectively with a pair of first and second exhaust passages 42 and 44 through the respective first and second exhaust ports 38 and 40, the exhaust passages 42 and 44 being disposed in contiguous relation to each other (FIG. 2). The first exhaust passage 42 communicates with the second exhaust passage 44 through a port or passage 46 disposed adjacent to the exhaust ports 38 and 40. The axes of the exhaust ports 38 and 40 converge toward the exhaust passages 42 and 44 and are disposed at an angle of less than 180°.

A plurality of first scavenge ports 48 are formed in the wall of the first cylinder 16 while a plurality of second scavenge ports 50 are formed in the wall of the second cylinder 18. A plurality of first scavenge passages 52 extend through the walls of the crankcase 24 and cylinder block 12 to the respective first scavenge ports 48 to communicate the interior of the crankcase 24 with the interior of the first cylinder 16. Similarly, a plurality of second scavenge passages 54 extend through the walls of the crankcase 24 and cylinder block 12 to the second scavenge ports 50 to communicate the interior of the crankcase 24 with the interior of the second cylinder 18. As is well known, the exhaust ports 38 and 40 as well as the scavenge ports 48 and 50 are opened and closed by the respective pistons 20 and 22 moving along the respective cylinders 16 and 18. Reference numeral 56 designates a spark plug.

The power strokes of the first and second cylinders 16 and 18 begin alternately at each 180° of crankshaft rotation. In other words, as described above, the second crank pin 34 is displaced 180° from the first crank pin 32. Therefore, when one of the first and second pistons 20 and 22 is at its top dead center position, the other is at its bottom dead center position.

FIG. 3 is a diagrammatic view illustrating the various degrees of crankshaft rotation showing the relation between the opening and closing of each of the first and second exhaust ports 38 and 40 as well as the relation between the opening and closing of the first and second scavenge ports 48 and 50. As described above, the second piston 22 in the second cylinder 18 is 180° out of phase from the first piston 20 in the first cylinder 16. The top dead center position of the first piston 16 is represented by 0° in FIG. 3. The first exhaust port 38 is opened at an angle A1 slightly less than 90° while the first scavenge ports 48 are opened at an angle B1 slightly larger than 90°. And, these scavenge and exhaust ports 48 and 38 are successively closed at an angle C1 slightly less than 270° and at an angle D1 slightly larger 270°, respectively.

The second exhaust port 40 is opened at an angle A2 slightly less than 270° while the second scavenge ports 50 are opened at an angle B2 slightly larger than 270°. And, these scavenge and exhaust ports 50 and 40 are successively closed at an angle C2 slightly less than 90° and at an angle D2 slightly larger 90°, respectively.

FIG. 4 is a diagrammatic illustration showing a change in pressure at each of the first and second exhaust ports 38 and 40 during the running of the engine 10. The positive pressure portion of the exhaust gas discharged from the first cylinder 16 or the combustion chamber appears at the first exhaust port 38 during a time period between the opening of the first exhaust port 38 and the opening of the first scavenge ports 48 (i.e., a duration between angle A1 and angle B1), that is to say, at an initial portion of the exhaust stroke of the first cylinder 16. Similarly, the positive pressure portion of the exhaust gas discharged from the second cylinder 18 or the combustion chamber appears at the second exhaust port 40 during a time period between the opening of the second exhaust port 40 and the opening of the second scavenge ports 50 (i.e., a duration between angle A2 and angle B2), that is to say, at an initial portion of the exhaust stroke of the second cylinder 18. As described above, the gas discharged from each of the first and second exhaust ports 38 and 40 is composed of alternate positive and negative pressure portions.

It is first assumed that the first and second exhaust passages 42 and 44 are provided independently of each other, that is to say, the port 46 is not provided. Then, in a predetermined range of the engine speed which is determined by the length of an exhaust chamber in each of the first and second exhaust passages 42 and 44, at a final portion of the exhaust stroke of each of the first and second cylinders 16 and 18, that is to say, during a time period between the closing of each of the first and second scavenge ports 48 and 50 and the closing of each of the first and second exhaust ports 38 and 40 (i.e., a duration between angle C1 and angle D1 or a duration between angle C2 and angle D2), the positive pressure portion of the reflected wave of the exhaust gas produced by each exhaust chamber reaches to a respective one of the first and second exhaust ports 38 and 40 to thereby force the blowby gas back into the interior of a respective one of the first and second cylinders 16 and 18 to enhance the charging efficiency.

However in those ranges of the engine speed other than the above predetermined range, the negative pressure portion of the reflected wave reaches each of the first and second exhaust ports 38 and 40 at the final portion of the exhaust stroke of each of the first and second cylinders 16 and 18, so that the blowby gas is positively drawn from a respective one of the first and and second cylinders 16 and 18, thereby lowering the charging efficiency to produce a lower power output. According to the present invention, even in those ranges of the engine speed, a good charging efficiency is acheived. More specifically, immediately before one of the first and second exhaust ports 38 and 40 is closed, the other is opened. In other words, a final portion of the duration of opening of one exhaust port overlaps an initial portion of the duration of opening of the other exhaust port. With this arrangement, the positive pressure portion of the exhaust gas discharged from one of the first and second exhaust ports 38 and 40 at the initial portion of the duration of opening thereof is propagated via the port 46 toward the other at the final portion of the duration of closing thereof, so that the pressure at the other exhaust port is rendered positive, as shown in broken lines in FIG. 4. Thus, a good charging efficiency of the fuel mixture is achieved over an entire effective range of the engine speed, thereby ensuring a desired power output of the engine 10.

FIG. 5 shows a modified two-cycle engine 10a which differs from the engine 10 of FIG. 1 in that a butterfly valve 60 is provided in the port 46 for angular movement about its axis 62. The valve 60 is operated by an actuator means (not shown) to be opened to communicate the first exhaust passage 42 with the second exhaust passage 44 in those ranges of the engine speed in which the negative pressure portion of the reflected wave is to reach one of the exhaust ports 38 and 40 at the final portion of the duration of opening thereof.

FIG. 6 shows another modified two-cycle engine 10b which differs from the engine 10a of FIG. 5 in that a port 46a extends transversely of the generally parallel first and second exhaust passages 42 and 44 and has such a length that when the butterfly valve 60 is brought into its open position shown in a broken line in FIG. 6, the opposite ends of the butterfly valve 60 will not project into the respective exhaust passages 42 and 44.

Figure 7:
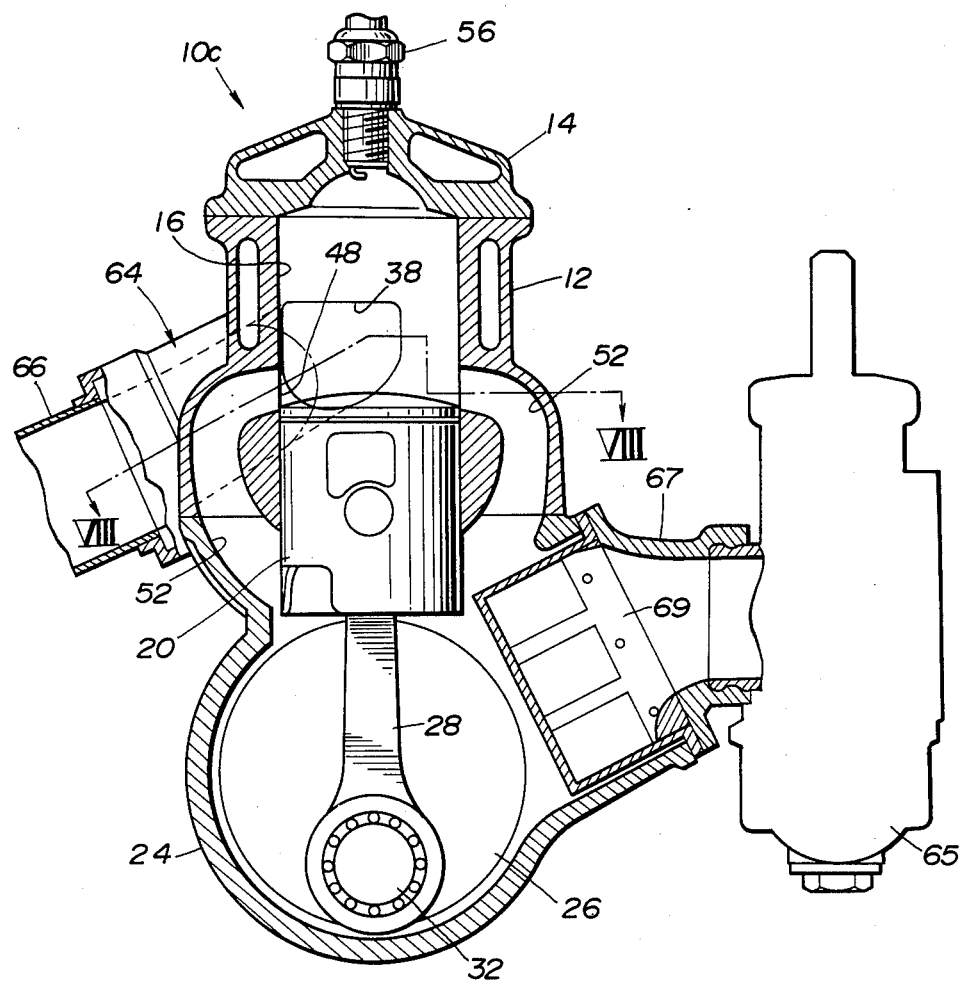
FIG. 7 is a cross-sectional view of a further modified engine.
Figure 8:
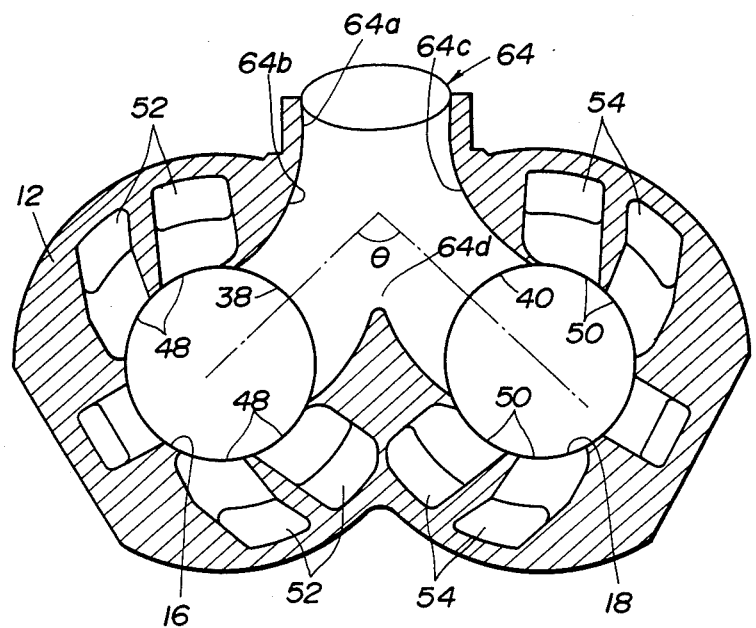
FIG. 8 is a cross-sectional view taken along the line VIII—VIII of FIG. 7.

FIGS. 7 and 8 shows a further modified two-cycle engine 10c which differs from the engine 10 of FIG. 1 only in that there is provided a single exhaust conduit 40 communicating with the first and second exhaust ports 16 and 18 via an exhaust manifold means.

As best shown in FIG. 8, an exhaust manifold 64 is formed in the cylinder block 12 and has a pair of branch passages 64b and 64c communicating with the first and second exhaust ports 38 and 40, respectively, at their one ends, and a main passage 64a at which the pair of branch passages 64b and 64c join together to provide a branched portion 64d, the branch passages 64b and 64c converging toward the main passage 64a and disposed at an angle $\theta(\theta<180°)$. The main passage 64a is connected to an exhaust pipe 66 having an exhaust chamber therein. Thus, the exhaust manifold 64 and the exhaust pipe 66 constitutes an exhaust passage means. In this embodiment, the first and second exhaust ports 38 and 40 are communicated with each other by means of the branch passages 64b and 64c of the exhaust manifold 64, although in the preceding embodiments, the first and second ports are communicated with each other via the port 46. Reference numeral 65 designates a carburetor, numeral 67 an intake manifold, and numeral 69 a one-way valve for preventing a backflow of the air-fuel mixture from the crankcase chamber to the intake manifold 67.

As described above for the engine 10 of FIGS. 1 and 2, the final portion of the duration of opening of one exhaust port overlaps the initial portion of the duration of opening of the other exhaust port. The positive pressure portion of the exhaust gas discharged from one of the first and second exhaust ports 38 and 40 at the initial portion of the duration of opening thereof is propagated toward the other via the adjacent branch passages 64b and 64c at the final portion of the duration of opening thereof, so that the pressure at the other exhaust port is rendered positive even in those ranges of the engine speed in which the positive pressure portion of the reflected wave is not to reach the other exhaust port. Thus, a good charging efficiency of the fuel mixture is achieved over an entire effective range of the engine speed, thereby ensuring a desired power output of the engine 10.

Figure 9:
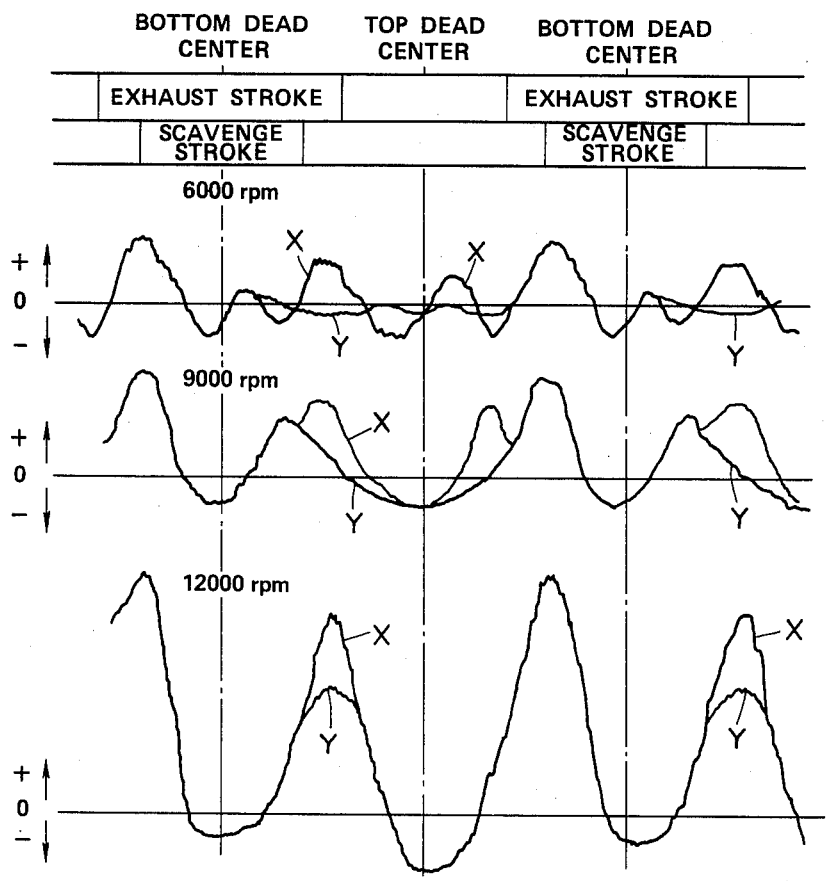
FIG. 9 is a diagrammatical illustration showing the comparison of the engine of FIG. 7 with a conventional two-cycle engine of the single-cylinder type.
Figure 10:
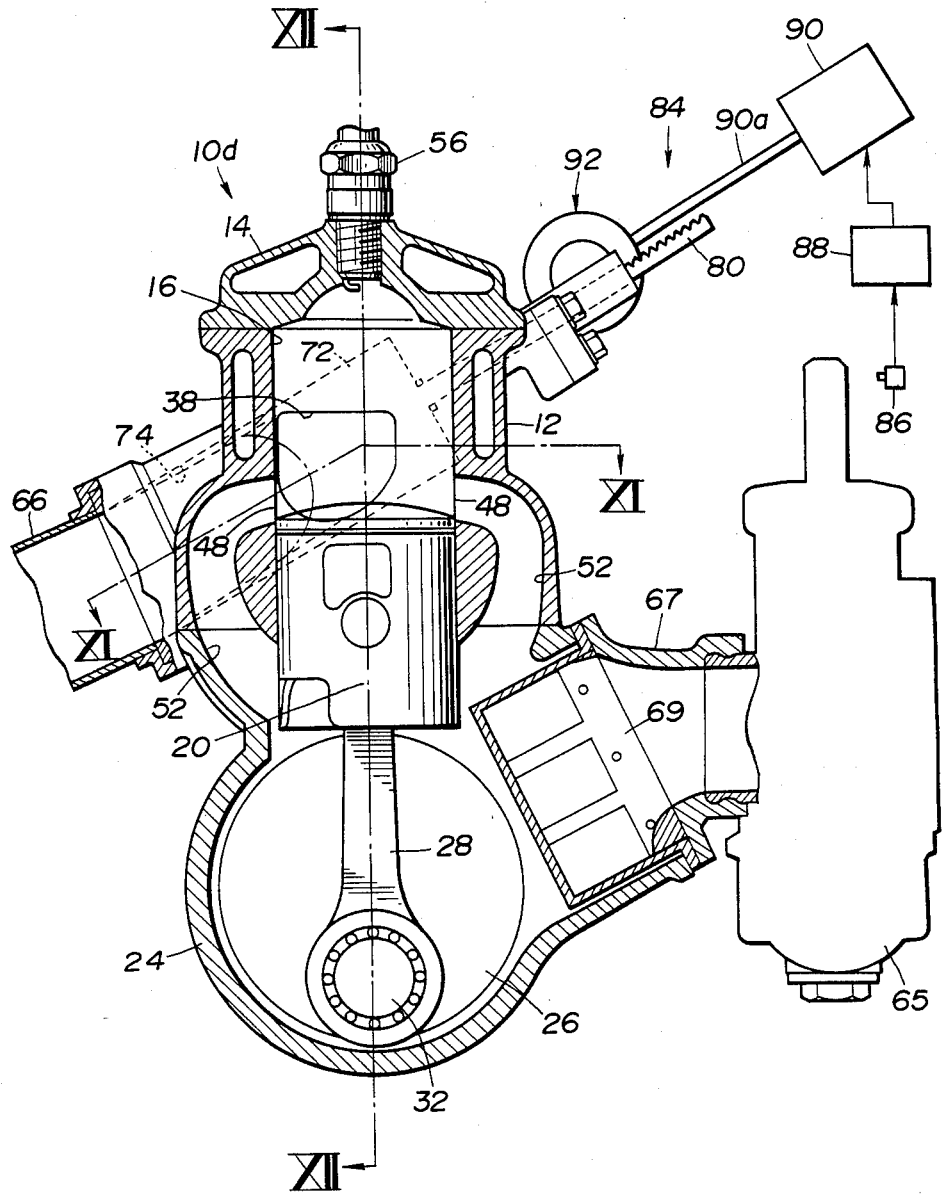
FIG. 10 is a view similar to FIG. 7 but showing a further modified engine.
Figure 11:
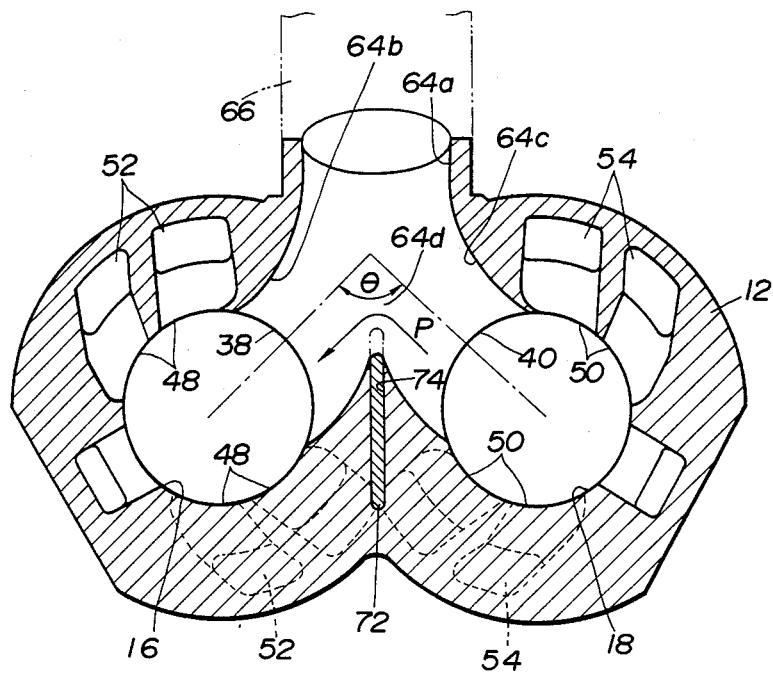
FIG. 11 is a cross-sectional view taken along the line XI—XI of FIG. 10.
Figure 12:
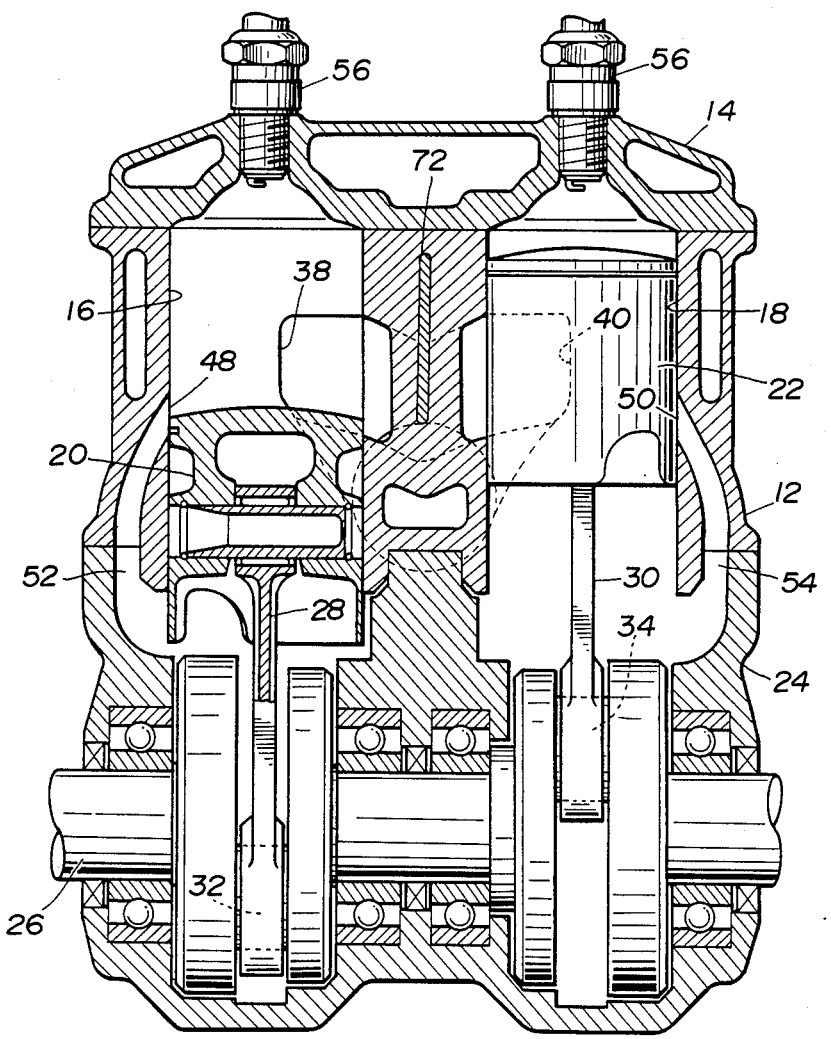
FIG. 12 is a cross-sectional view taken along the line XII—XII of FIG. 10.
Figure 13:
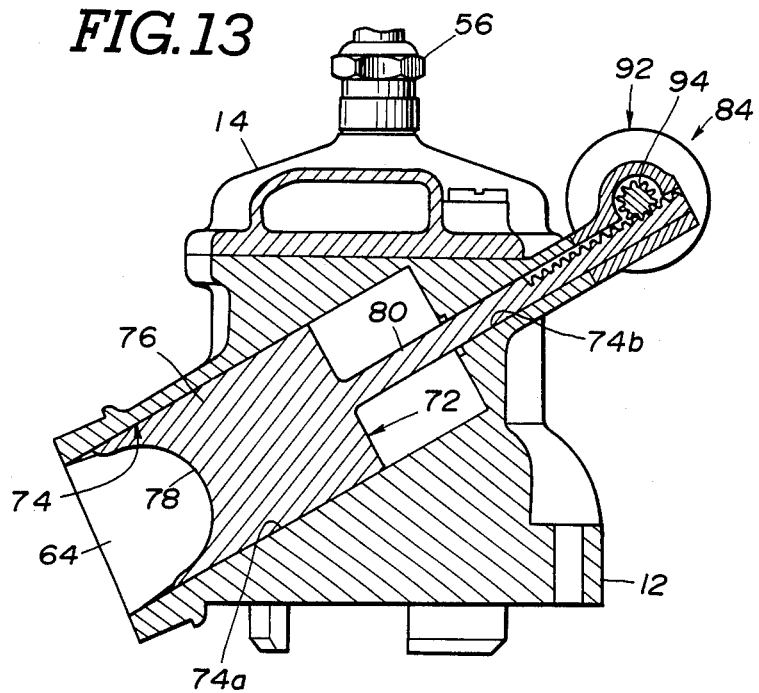
FIGS. 13 and 14 are cross-sectional views of a portion of the engine of FIG. 10, respectively, showing the movement of a partition wall member.
Figure 14:
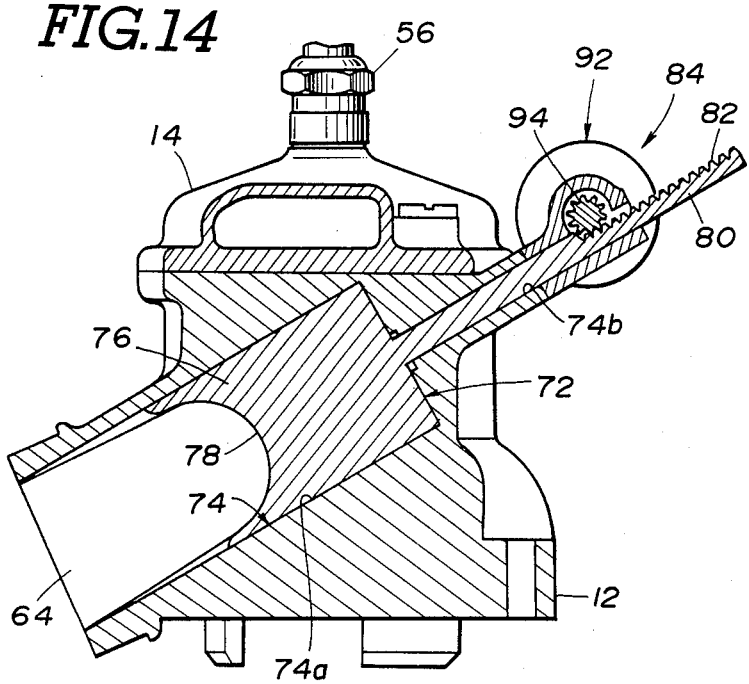

FIG. 9 is a diagrammatical illustration showing the comparison of the engine 10c with a conventional two-cycle engine of the single-cylinder type, in which curve X represents a pressure at either the first or second exhaust port 38, 40 while curve Y represents a pressure at the exhaust port of the conventional engine. These two engines have the same exhaust chambers which achieve the maximum charging efficiency of the fuel-air mixture in the combustion chamber at an engine speed of 12,000 rpm. As is clear from FIG. 9, although the pressure at the exhaust port of the conventional engine is positive at an engine speed of 12,000 rpm at the final portion of the exhaust stroke, this pressure is negative at both 9,000 rpm and 6,000 rpm at such a final portion. On the other hand, the pressure at the exhaust port of the engine 10c is positive at any of 12,000 rpm, 9,000 rpm and 6,000 rpm at the final portion of the exhaust stroke.

FIGS. 10 to 14 show a further modified two-cycle engine 10d which differs from the engine 10c of FIGS. 7 and 8 in that a partition wall member 72 is provided for moving into and out of the branched portion 64d of the exhaust manifold 64 where the pair of branched passages 64b and 64c join together.

An elongated guide hole 74 is formed in that portion of the cylinder block 12 disposed between the first and second cylinders 16 and 18, and the guide hole 74 lying in a plane parallel to the axes of the first and second cylinders 16 and 18. The guide hole 74 has a major portion 74a and a narrow portion 74b extending outwardly from one end of the major portion 74a and opening to the outer surface of the cylinder block 12. The other end of the major portion 74a opens to the branched portion 64d of the exhaust manifold 64. The partition wall member 72 has a partition portion 76 of a generally rectangular shape having one end 78 formed into a semi-circular concave shape, and a rod portion 80 formed integrally with and extending from the other end of the partition portion 76 along a longitudinal axis of the partition wall member 72, a rack 82 being formed on the rod portion 80. The partition wall member 72 is received in the guide hole 74 for sliding movement therealong, with the partition portion 76 and the rod portion 80 being received in the major portion 74a and the narrow portion 74b, respectively.

An actuator means 84 is provided for moving the partition wall member 72 into and out of the branched portion 64d of the exhaust manifold 64 in a stepless manner in accordance with the engine speed at which the engine 10d is operated, as will hereinafter more fully be described. The actuator means 84 comprises a speed sensor 86 for detecting the engine speed to produce a detecting signal, a control circuit 88 responsive to the sensing signal to produce a drive signal, a servomotor 90 responsive to the drive signal for being driven, and a gearing 92 operatively coupled to an output shaft 90a of the servomotor 90 which is adapted to be rotated about an axis thereof. A pinion 94 serving as an output element of the gearing 92 meshingly engages the rack 82 on the partition wall member 72. With this construction, upon rotation of the servomotor 90, the partition wall member 72 is moved along the guide hole 74 through the mating rack and pinion 82 and 94.

As described above for the preceding embodiments, with the engine 10d, immediately before one of the first and second exhaust ports 38 and 40, for example, the first exhaust port 38, is closed, the other exhaust port (i.e., the second exhaust port 40) is opened. At this time, the pressure wave of the exhaust gas discharged from the second exhaust port 40 reaches the first exhaust port 38 along a path P (FIG. 11) constituted by the branch passage 64c, the branched portion 64d, and the branch passage 64b. At this time, the movement of the partition wall member 72 along the guide hole 74 is controlled by the actuator means 84 in accordance with the engine speed so as to adjust the length of the path P in such a manner that the above-mentioned pressure wave from the second exhaust port 40 reaches the first exhaust port 38 immediately before the first exhaust port 38 is closed. Thus, the blowby gas from the first exhaust port 38 can be suitably forced back into the first cylinder 16 at the final portion of the duration of opening thereof at any effective range of the engine speed, thereby achieving a good charging efficiency. By virtue of the provision of the semi-circular concave end 78 of the partition wall member 72, the pressure wave of the exhaust gas from one of the exhaust ports 38 and 40 can be smoothly directed toward the other along the path P even when the partition portion 76 is extended into the branched portion 64d of the exhaust manifold 64.

Figure 15:
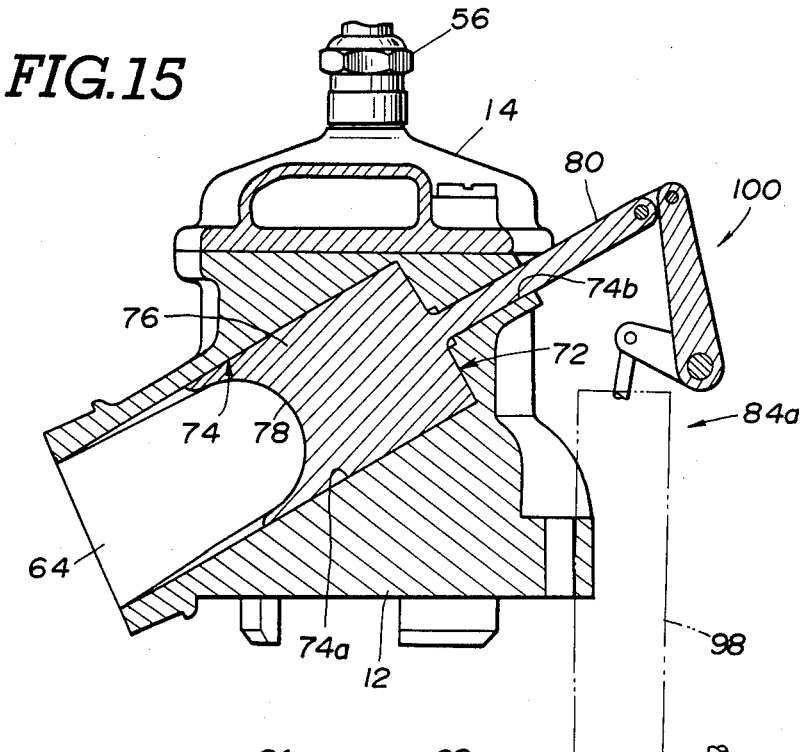
FIG. 15 is a view similar to FIG. 13 but showing a portion of a modified actuator means.
Figure 16:
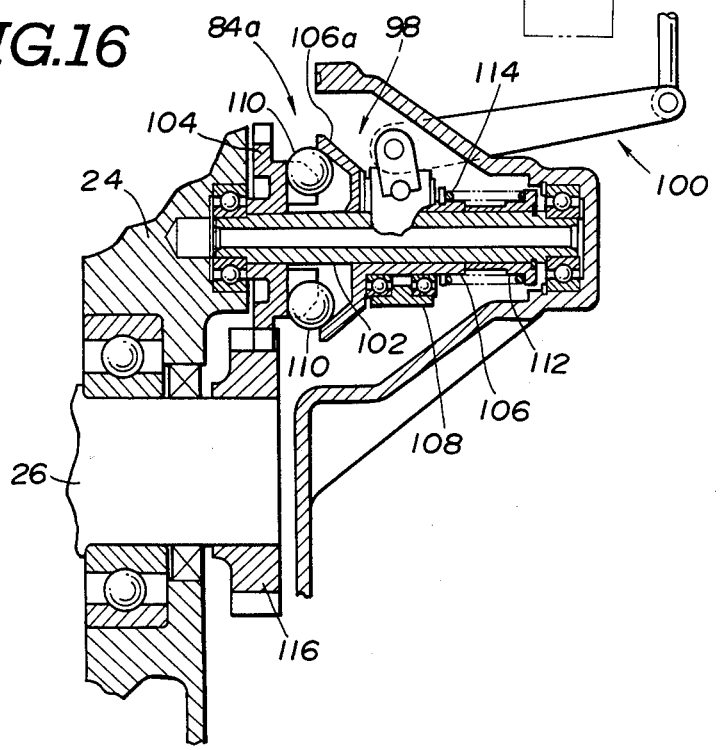
FIG. 16 is a cross-sectional view of the modified actuator means, showing other portions.

FIGS. 15 and 16 show a modified actuator means 84a for moving the partition wall member 72, the actuator means 84a being composed entirely of mechanical parts, that is to say, including no electronic or electrical components. The actuator means 84a comprises a centrifugal governor 98 and a linkage 100. The centrifugal governor 98 comprises a shaft 102 mounted on the crankcase 24 for rotation about an axis thereof, a gear 104 fixedly mounted on the shaft 102, a sleeve 106 mounted on the shaft 102 for movement therealong and having a dish-shaped portion 106a, a bearing 108 (shown as partly broken for illustration purposes) rotatably mounted on the sleeve 106 and movable along the axis of the shaft 102 in unison with the sleeve 106, balls 110 received by the dish-shaped portion 106a, a collar 112 mounted on the shaft 102, and a compression coil spring 114 wound around the shaft 102 and acting between the collar 112 and the sleeve 106 for normally urging the sleeve 106 against the balls 110.

A gear 116 is fixedly mounted on the crankshaft 26 and meshingly engages the gear 104. One end of the linkage 100 is connected to the bearing 108 while the other end is connected to the rod portion 80 of the partition wall member 72. With this construction, the rotation of the crankshaft 26 causes the shaft 102 to rotate, so that the balls 110 are displaced outwardly under the influence of centrifugal force to move the sleeve 106 away from the gear 104 against the bias of the coil spring 114. At this time, the bearing 108 is moved together with the sleeve 106 to operate the linkage 100, so that the partition wall member 72 is moved along its axis, as described above for the preceding embodiment of FIGS. 10 to 14. Thus, the movement of the partition wall member 72 along the guide hole 74 is controlled by the actuator means 84a in accordance with the engine speed.

Figure 17:
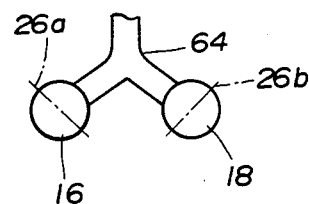
FIGS. 17 and 18 are schematic views showing crankshaft arrangements, respecticely.
Figure 18:
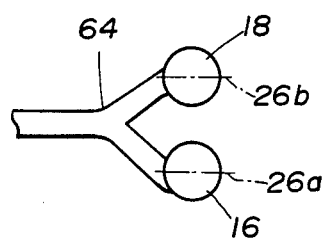

While the two-cycle engines according to the invention have been specifically shown and described herein, the invention itself is not to be restricted by the exact showing of the drawings or the description thereof. For example, it will suffice that the first and second pistons 20 and 22 are 180° out of phase, and it is not always necessary that the first and second pistons 20 and 22 are connected to one common crankshaft 26 via the respective connecting rods 28 and 30. For example, as shown in FIG. 17, the first and second pistons 20 and 22 may be connected respectively to a pair of crankshafts of which axes 26a and 26b are disposed at an angle of 90°. Also, as shown in FIG. 18, these two pistons 20 and 22 may be connected respectively to a pair of crankshafts of which axes 26a and 26b are disposed in parallel relation to each other.

Although in the illustrated embodiments the engine has one pair of cylinders, it may have a plurality of pairs of cylinders such as four cylinders and six cylinders, each pair of cylinders having the first and second exhaust ports which either communicate with each other or are communicatable with each other via the exhaust passages as described above.

Further, although the actuator means is operated to move the partition wall member in a stepless manner, it may be of the type which operates the partition wall member to move in a stepped manner.

What is claimed is:

1. A two-cycle engine comprising:
   a cylinder block having at least one pair of first and second cylinders, said first and second cylinders having a pair of first and second exhaust ports, respectively;
   a pair of first and second pistons received respectively in said first and second cylinders for reciprocal movement therealong, each of said first and second exhaust ports being selectively closed and opened by a respective one of said first and second pistons during the movement thereof along a respective one of said cylinders;
   crankshaft means to which said first and second pistons are operatively connected in such a manner that said first and second pistons are reciprocable 180° out of phase along the respective cylinders, a final portion of the duration of opening of one of said exhaust ports overlapping an initial portion of the duration of opening of the other;
   exhaust passage means having means communicating said first and second exhaust ports with each other adjacent thereto, said exhaust passage means comprising an exhaust manifold which has a pair of branch passages communicating respectively with said first and second exhaust ports at one end thereof and a main passage at which said pair of branch passages join together at the other ends thereof to provide a branched portion;
   a partition wall member mounted on said cylinder block for movement into and out of said branched portion of said exhaust meanifold; and
   actuator means operable to control the movement of said partition wall member in accordance with the engine speed at the final portion of the duration of opening of one of said exhaust ports.

2. A two-cycle engine according to claim 1, in which said actuator means comprises a speed sensor for detecting the engine speed to produce a detecting signal, a control circuit responsive to said sensing signal to produce a drive signal, and a drive means responsive to said drive signal for driving said partition wall member to move via a transmission means.

3. A two-cycle engine according to claim 1, in which said actuator means comprises a centrifugal governor operatively connected to said crankshaft means for being driven, and a linkage connected to said centrifugal governor at one end thereof while the other end is operatively coupled to said partition wall member for moving the same.

* * * * *